United States Patent Office 3,218,336
Patented Nov. 16, 1965

---

3,218,336
2,5-DIHYDROTHIOPHENE S-SUBSTITUTED SALTS AND PROCESS THEREFOR
Sheldon B. Greenbaum, Tonawanda, N.Y., assignor to Hooker Chemical Corporation, Niagara Falls, N.Y., a corporation of New York
No Drawing. Filed June 2, 1961, Ser. No. 114,311
12 Claims. (Cl. 260—329)

This invention relates to a novel process for preparing a partially unsaturated sulfur containing heterocycle and various salts thereof. More particularly, this invention describes a simple, commercially adaptable method for preparing 2,5-dihydrothiophene (alternatively known as 3-thiolene) and various S-substituted 2,5-dihydrothiophenonium salts. The term "S-substituted 2,5-dihydrothiophenonium salts" includes the simple S-alkylated as well as the S-substituted alkyl salts. The compositions made by this process are of the structure:

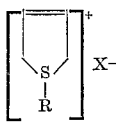

wherein R is an organic radical having two or more carbon atoms selected from the group consisting of alkyl, substituted alkyl, alkyl S-(2,5-dihydrothiophenonium), substituted alkyl S-(2,5-dihydrothiophenonium), alkoxyalkyl, alkenylalkyl, and alkylmercaptoalkyl, and X is a halide preferably chloride or bromide.

These compositions and the lower known methyl homologue are formed as intermediates in the inventive process for preparing 2,5-dihydrothiophene. The reactions are as follows:

1.
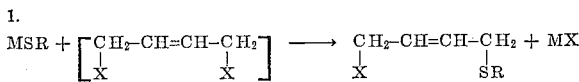

2.
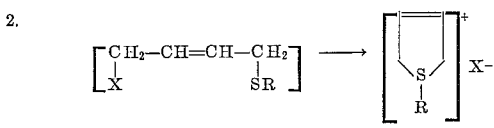

3.
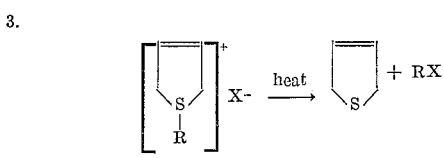

wherein M is a metal cation preferably an alkali metal selected from the group consisting of sodium, potassium and lithium, R is an organic radical selected from the group consisting of alkyl, substituted alkyl, alkyl S-(2,5-dihydrothiophenonium), substituted alkyl S-(2,5-dihydrothiophenonium), alkoxyalkyl, alkenylalkyl, and alkylmercaptoalkyl, and X is a halogen preferably chlorine or bromine. Where R is an alkyl S-(2,5-dihydrothiophenonium) group the compositions may also be named as alkylene bis-S-2,5-dihydrothiophenonium) halides. Also named herein are those bis-S-(2,5-dihydrothiophenonium) compounds wherein the sulfur atoms are connected by alkyloxyalkyl or alkylthioalkyl moieties.

While thiophene has been known for many years and is present and readily available as a by-product of benzene prepared from coal tar, 2,5-dihydrothiophene, a valuable basic starting material for organic synthesis, has been known for less than a decade and its chemistry is much less known. Thus, because of its valuable heterocyclic nature, and its double bond which lends itself very easily to addition type reactions, 2,5-dihydrothiophene as a starting material could give rise to many pesticidally or herbicidally active compounds or their intermediates heretofore unknown.

Ostensibly, the preparation of 2,5-dihydrothiophene would seem to offer little difficulty, however until the instant inventive process was discovered no good commercially adaptable process was available to the art. The obvious process, which seems reasonable a priori, of reacting a 1,4-dihalo-butene-2 with sodium sulfide is capricious, either giving rise to no yield or very little yield of an undistillable viscous crude oil. See Liebig's Annalen der Chemie, volume 596, page 96 (1955). Based upon the failure of this method, it was entirely unexpected that the closely analogous reaction of an alkali metal alkyl mercaptide with the same 1,4-dihalobutene-2 after the application of high temperature would produce the desired 2,5-dihydrothiophene in good yield. The reaction really goes through two stages: the first being the formation at temperatures ranging from minus ten to forty degrees centigrade of the intermediate and optionally nonisolated $RSCH_2CH=CHCH_2X$ compound, which under the application of a slight amount of heat re-arranges or cyclicizes to the S-alkyl-2,5-dihydrothiophenonium salt. The same re-arrangement takes place on allowing the $RSCH_2CH=CHCH_2X$ compound in the reaction mixture to remain at room temperature or lower for a sufficiently long time. This re-arrangement brings about the formation of a novel series of S-alkylated sulfonium salts whose ethyl and higher alkyl homologues are unreported in the literature, and which have been found to be useful pesticides. If the 2,5-dihydrothiophene rather than the S-alkylated salt is desired the second step is to decompose the salt at high temperatures to the alkyl halide plus 2,5-dihydrothiophene.

In its process aspect, this invention offers several major advantages over the processes of the prior art. For example, one important advantage of this process is that it makes available for the first time quantities of an important basic sulfur containing heterocyclic intermediate, at low cost, from inexpensive and readily available starting materials, by a process that is especially adaptable to commercial exploitation.

Another process advantage is that the inventive process produces the 2,5-dihydrothiophene in good yield and in a sufficient state of purity so that it may be utilized in most organic synthesis without preliminary or further purification.

This invention in its composition aspect, offers several important major advantages. For example, the S-substituted 2,5-dihydrothiophenonium halide products of this invention have activity as pesticides, germicides and fungicides and are valuable as organic intermediates. It is as fungicides, especially as foliar and soil fungicides, that these compositions have been shown to be most valuable. For reasons not fully understood at this time, while the compounds having two or more carbon atoms such as the S-ethyl-(2,5-dihydrothiophenonium) halides have acceptable foliar fungicidal activity, the foliar fungicidal activity increases with carbon chain length until a maximum foliar fungicidal activity appears in the compounds having eighteen carbons and the activity begins to fall off in compounds having greater than this number of carbon atoms. As foliar fungicides, these compositions have been found to be valuable in the treatment of *Alternaria solani*, the causative pathogenic fungi in tomatoes and other vegetables including beans. Surprisingly enough, the S-substituted 2,-dihydrothiophenes having one carbon atom such as the S-methyl(2,5-dihydrothiophenonium) halides have no foliar fungicidal activity whatsoever. Thus, the activity of the products of this invention as foliar fungicides begins at two carbon atoms, becomes more pronounced where there are eight or more carbon atoms, and begins to cut off after eighteen carbon atoms. For this reason, the preferred compositions of this invention as foliar fungicides are those compositions containing at least eight carbon atoms and no more than eighteen carbon atoms. It should be pointed out that in all biocidal uses, including fungicidal uses, all of the halides are equivalents.

Because of this broad spectrum of activity in addition to being valuable as organic intermediates in themselves, the S-substituted-2,5-dihydrothiophenonium halide compositions of this invention would be valuable as intermediates, in the preparation of other fungicidal and pesticidal compositions of matter.

While all of the novel compositions of this invention are valuable fungicides, as is any large group of compositions possessing a common activity there are pronounced differences in activity between various members of the group. For example, a subgroup of these compositions, the alkylene bis 2,5-dihydrothiophenonium salts are especially valuable as soil fungicides, an area where the generic group of compounds is only marginally acceptable. This valuable subgroup of compounds having extremely high toxicity toward soil microbial pathogens such as Pythium and *Sclerotinia rolfsii*, represent the preferred embodiment of the composition aspect of this invention and are defined by the subgroup having the formula:

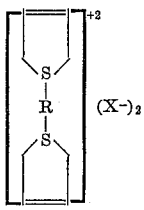

where X is the halide anion and R is a bivalent organic radical whose carbon atoms are linked to the dihydrothiophenonium radicals. Examples of these preferred soil microbial pathogenic toxicants are: 1,2-ethylenebis(2,5-dihydrothiophenonium), 1,2- and 1,3-propylene bis(2,5-dihydrothiophenonium), 1,4-tetramethylenebis(2,5-dihydrothiophenonium, 2-butenylene-1,4-bis(2,5-dihydrothiophenonium), 2-butynylene-1,4-bis(2,5-dihydrothiophenonium), 3-oxapentamethylene-1,5-bis(2,5-dihydrothiophenonium), 3-thiapentamethylene-1,5-bis(dihydrothiophenonium), 1,5-pentamethylenebis(2,5-dihydrothiophenonium), 1,6-hexamethylenebis (2,5-dihydrothiophenonium). 1,7-heptamethylene-bis(2,5-dihydrothiophenonium), 1,8-octamethylenebis(2,5-dihydrothiophenonium), 3,6-dioxaoctamethylene - 1,8-bis(2,5-dihydrothiophenonium), and decamethylenebis(2,5-dihydrothiophenonium) chlorides, bromides and iodides.

The above soil bacterial and fungal toxicants have shown remarkably high efficacy in controlling soil pathogens including but not limited to Pythium and *Sclerotinia rolfsii* at rates as low as two to four pounds per acre. Higher rates may be used to control heavily infested and recalcitrant organisms, economics being the prime governing factor of the upper limits of application. Still lower rates can be used by employing row treatment, spot treatment, or application to the seeds.

As fungicides or pesticides these products offer several additional advantages. Among them are high solubility in various hydrophilic solvents as well an ease of formulation, and compatibility with other pesticides and fungicides. Since many fungicidal compositions are applied as a spray the ease of solubility of these S-alkyl sulfonium salts is a definite advantage. Typical solvents include water, the aliphatic alcohols and various ketones, glycols and glycol ethers. These compositions may be formulated in various states of purity in various ways.

For example, it may be used as a reaction "crude" or as the crystalline product. It may be employed by mixing it with conventional pest control adjuvants, diluents or conditioning agents, hereinafter referred to as inert carriers, to provide compositions in the form of solutions, emulsions, dispersions, powders dispersible in water or other solvents, dusts or the like. For example, it may be formulated with a carrier or diluent substance such as finely divided solid, a solvent of organic or inorganic origin, water, a surface active agent or aqueous emulsion or any suitable combination of one or more of any of these. Such formulations or compositions facilitate handling and application and frequently enhance insecticidal effectiveness.

The liquid compositions discussed generally above, whether solutions or dispersions of the active agents in a liquid solvent or wettable powder, may contain conditioning agents such as wetting agents, dispersing agents, emulsifying agents, suspending agents and the like, known generally as surface active agents. A suitable but not exhaustive listing of these surface active agents are set forth among other places in "Soap and Chemical Specialties," vol. 31, No. 7, pages 50–61; No. 8, pages 48–61; No. 9, pages 52–67 and No. 10, pages 38 to 67 (1955).

As previously indicated these fungicidal and pesticidal products offer the advantage of compatibility with other fungicides and pesticides such as the metal dimethylthiocarbamates and ethylenebis-(dithiocarbamates), and with various insecticides such as benzene hexachloride, chlordane and the N-alkylphenyl carbamates. Other advantages of the compositions of this invention will suggest themselves to one skilled in the prior art.

For reasons of yield, the preferred conditions for preparing 2,5-dihydrothiophene is to add a methanolic solution of an alkali metal methyl mercaptide to 1,4-dihalobutene-2 rich in cis isomer in an inert atmosphere, and then to decompose the resultant S-methyl 2,5-dihydrothiophenonium halide by heating above one hundred and ninety degrees centigrade, so that the low boiling methyl chloride is distilled off as a gas while the higher boiling 2,5-dihydrothiophene product is left behind. If desired, because of the disparity in boiling points, both the methyl halide and 2,5-dihydrothiophene may be distilled together and the 2,5-dihydrothiophene condensed comparatively free of contaminants.

Alternatively, the compositions of this invention may be made by reacting 2,5-dihydrothiophene with an alkyl halide. In the case of the preferred alkylene bis-S-(2,5-dihydrothiophenonium) compounds, this method is especially advantageous. However, for the non "bis" compounds, this method is too expensive and tedious in that it requires the use of the 2,5-dihydrothiophene as a starting material which of course can only be made conveniently through the formation of the sulfonium salt, which, in effect, would mean going through the reaction twice. For this reason, the inventive process is the preferred method.

However, there is considerable latitude in performing the inventive process insofar as reaction conditions are concerned. Thus, conditions such as the order of adding reactants, whether or not an inert atmosphere is to be used, the pressure, reaction times and temperatures and the equivalent materials that may be used in the process can be varied to suit the convenience of the user. For example, if desired, the methyl mercaptan may be added to an alkaline methanolic solution of the dihalobutene or the mercaptide may be separately made, or less preferentially, because of competing reactions which reduce the yield drastically, the halobutene may be added to a methanolic solution of an alkali metal mercaptide in an inert atmosphere.

The reaction vessel used in this inventive process need not be of any particular shape or design although a provision for heating and cooling is essential and good agitation through any efficient means is desirable. Where the 2,5-dihydrothiophene rather than the sulfonium salt is the desired product, it is convenient to distill both the alkyl halide and the 2,5-dihydrothiophene off and preferentially collect in an appropriate vessel the 2,5-dihydrothiophene. For this purpose, it is desirable to use a reaction vessel fitted with fractionating means and an appropriate vessel to collect the distilled 2,5-dihydrothiophene. Where the sulfonium salts are the desired products, none of the fractionating equipment is needed.

The bases that may be utilized among others include the alkali metal hydroxides and alkoxides, ammonia, and its hydroxide and carbonate, various water and alcohol soluble amines such as di- and tri-ethylamine, pyridine and the like. The main criterion of the base is that it, when added to the reaction mixture, will produce a sufficient amount of the mercaptide ion. While the presence of a solvent in the 2,5-dihydrothiophene producing reaction is not essential, the reaction has been found to proceed more smoothly and give somewhat better yields when a solvent for the mercaptide is used. Ethanol and methanol have proved to be satisfactory, although other solvents would probably be workable though not offering the lower cost and convenience that the two lower alcohols do. Among the contemplated solvents are water and other aliphatic alcohols, and ketones having the required solubility characteristics. The time necessary for the reaction to go to completion varies considerably depending upon temperature but one to three hours has been found to be an average figure. Similarly, the temperature used to decompose the S-methyl-2,5-dihydrothiophenonium chloride to 2,5-dihydrothiophene may vary between one hundred and fifty and two hundred and fifty degrees centigrade. Generally, one hundred and ninety to two hundred and ten degrees centigrade has been found to be satisfactory. The use of an inert atmosphere while not essential, does reduce to some extent contaminating byproducts. Obviously, the choice between the chloro or another halo butene is dictated largely on economic considerations. Similarly, the use of sub-atmospheric pressures, while speeding up reaction and distillation time is governed by cost and convenience. While some agitation during the reaction is desirable, it may be accomplished through a variety of methods including shaking, oscillation, stirring, and forcing a stream of an inert gas through the reaction mixture.

Where the "S-alkyl sulfonium salt" rather than the 2,5-dihydrothiophene is the desired product, the temperature, reaction time and choice of solvents is somewhat more restricted.

The following reaction conditions have been found to represent the preferred embodiment of the process to prepare the "S-alkyl sulfonium salt."

The 1,4-dihalo-butene-2 in methanolic solution in an inert atmosphere is treated between minus ten and forty degrees centigrade with a methanolic solution containing the alkali metal alkyl mercaptide whose alkyl group corresponds to the alkyl group that it is desired to "S" substitute. After approximately one hour the formation of the 1,4-disubstituted butene is indicated by the precipitation of the alkali metal salt. This inorganic salt may be removed by filtration or centrifugation or the like and the filtrate concentrated to a residue before preceding to the second step which is to cause re-arrangement of the 1,4-disubstituted butene to the S-alkyl-2,5-dihydrothiophenonium salt through the slight application of heat. If the presence of the contaminating salt is not detrimental, the precipitate of inorganic salt need not be removed from the reaction solution, and the total reaction mixture containing the inorganic salt evaporated down to a solid residue. Here, depending upon the intended use, the salt may be removed by recrystallization or the like. The same variations, equivalents and alternatives of materials, order of addition and process up to this final step may be made as stipulated in the previously described related process for preparing the 2,5-dihydrothiophene.

To better illustrate this invention in its composition and process aspects, the following additional examples are submitted. Except as indicated by the specification and claims, these examples in no manner or form are to be construed as limitation of these inventive concepts.

*Example 1.—Preparation of S-methyl-2,5-dihydrothiophenonium chloride*

A solution of three and one-third parts by weight of sodium hydroxide in twelve parts by weight of methanol is cooled below ten degrees centigrade and treated with four parts by weight of methyl mercaptan. The resulting solution is added to ten parts by weight of a commercial grade of 1,4-dichlorobutene-2 composed of about sixteen percent of the cis isomer and forty-five percent of the trans isomer and contained in an additional twelve parts by weight of methanol. After the solution has reached neutrality, it is refluxed for one hour and allowed to remain at room temperature overnight. After a concentration to dryness, the product was dissolved in a small amount of methanol and precipitated by the addition of acetone. After recrystallization, the product had a melting point of one hundred and sixty-five to one hundred and sixty-six degrees. The infra-red and ionic chloride established its identity as S-methyl-2,5-dihydrothiophenonium chloride.

*Analysis.*—Calcd. for $C_5H_9ClS$: S, 23.5 percent; Cl, 26.2 percent. Found: S, 23.1 percent; Cl (Volhard), 26.2 percent.

*Example 2.—Preparation S-methyl-2,5-dihydrothiophenonium chloride (method 3)*

In this procedure the alkali metal mercaptide is made first as follows:

To an appropriate reaction vessel, under nitrogen atmosphere is added with stirring one hundred and twenty parts of methanol and ten parts by weight of sodium. The resulant sodium methoxide-methanol solution is chilled to zero degrees centigrade and twenty parts by weight of methyl mercaptan slowly added over a period of an hour or more. The above methyl mercaptide solution is added dropwise to fifty parts by weight of fractionated commercial grade dichlorobutene-2 containing about ninety-six percent by weight of the cis isomer and three percent of the trans isomer, dissolved in one hundred and twenty parts by weight of methanol. The reaction solution is allowed to come to room temperature and the stirring continued overnight. The precipitated salt is then removed and the reaction solution concentrated and purified as in Example 1. Again the colorless crystalline product which melted one hundred and sixty-five to one hundred and sixty-six degrees centigrade was demonstrated to be S-methyl-2,5-dihydrothiophenonium chloride.

*Example 3.—Preparation of S-methyl-2,5-dihydrothiophenonium chloride*

In a reaction vessel, provided with facilities for cooling heating and stirring under an ordinary or inert atmosphere, are added the following compounds in the order specified: twenty-four parts by weight of methanol, ten parts by weight of commercial 1,4-dichlorobutene-2 made up of ninety-six percent by weight of the cis isomer and three percent trans isomer, in which has been dissolved three and one-third parts by weight of sodium hydroxide and finally four parts by weight of methyl mercaptan. During the additions, the temperature is maintained at zero to ten degrees centigrade and vigorous stirring is maintained. After a little over an hour, the sodium chloride which has precipitated is removed by filtration and the cooling source withdrawn. After the filtrate has remained at room temperature for thirty hours, the filtrate is concentrated under vacuum to a solid residue. This residue is purified by dissolving in 2.5 times its weight of methanol and filtering off the remaining insoluble residue. The product is precipitated in a crystalline state by adding an excess of acetone. The infra-red and ionic chloride analysis establishes the identity of S-methyl-2,5-dihydrothiophenonium chloride, the desired product which is a colorless crystalline water soluble solid melting at one hundred and sixty-five to one hundred and sixty-six degrees centigrade.

*Example 4.—Preparation of 2,5-dihydrothiophene*

One hundred parts by weight of the product obtained from Example 3 is heated under a nitrogen atmosphere to a temperature between one hundred and ninety to two hundred and fifteen degrees centigrade. During the heating period decomposition takes place and methyl chloride is expelled and the condensed 2,5-dihydrothiophene collected in a receiving vessel. This material upon re-distillation yields a liquid product whose infra-red spectrum, boiling point of one hundred and twenty-two to one hundred and twenty-four degrees, refractive index $N_{20}^D$ 1.5304, and formation of a tetrabromide derivative in greater than ninety-five percent yield melting at one hundred and four to one hundred and five degrees, established it to be identical in all respects to the 2,5-dihydrothiophene disclosed by Birch and McAllen (Nature 165, 899 (1950)).

*Example 5.—Preparation of S-ethyl-2,5-dihydrothiophenonium bromide*

Using the procedure of Example 3, the following materials are added to the reaction vessel in the indicated order with vigorous stirring and cooling. Twelve parts by weight of methanol, two parts by weight of potassium, two parts by weight of ethyl mercaptan. To the potassium ethyl mercaptide solution is added a solution of six parts by weight of commercial grade 1,4-dibromobutene-2, having a cis isomer content of about sixteen percent by weight and a trans content of forty-five percent, in twelve parts by weight of methanol. About one and one-half hours after the last addition, the salt is removed by filtration and the temperature of the reaction filtrate allowed to reach room temperature. After sixteen hours at room temperature the remaining methanol is removed under vacuum and the solid residue dissolved in 2.5 times its weight of ethanol. The insoluble matter is filtered off and the product precipitated by the addition of an excess of acetone. The infra-red spectrum ionic bromide analysis and conversion upon heating to 2,5-dihydrothiophene confirmed the identity of S-ethyl-dihydrophenonium bromide, melting point one hundred and fifty-four to one hundred and fifty-five degrees centigrade.

*Analysis.*—Calcd. for $C_6H_{11}BrS$: Br, 41.0 percent. Found: Br, 40.9 percent (Volhard).

*Example 6.—Preparation of S-n-butyl-2,5-dihydrothiophenonium bromide*

The procedure of Example 5 is repeated using the same temperature control, stirring and inert atmosphere and order of addition of the reactants, except that n-butyl mercaptan is substituted for ethyl mercaptan and metallic potassium is substituted for lithium.

The product which is obtained after the same concentration and purification procedures given in detail previously, is established to be the desired n-butyl-dihydrothiophenonium bromide melting at one hundred and three to one hundred and six degrees centigrade.

*Analysis.*—Calcd. for $C_8H_{15}BrS$: Br, 35.9 percent. Found: Br, 35.8 percent (Volhard).

*Example 7.—Preparation of S-n-octyl-2,5-dihydrothiophenonium bromide*

The reaction, isolation and purification procedures of Example 5 are followed except that n-octyl mercaptan is substituted for methyl mercaptan. The product melting at one hundred and eleven to one hundred and thirteen degrees centigrade is shown by infra-red analysis and conversion upon heating to 2,5-dihydrothiophene to be the desired S-n-octyl-2,5-dihydrothiophenonium bromide.

*Analysis.*—Calcd. for $C_{12}H_{23}BrS$:Br, 28.6 percent. Found: Br, 28.5 percent (Volhard).

*Example 8*

Using the procedure of Example 3, the following S-alkyl-2,5-dihydrothiophenonium halides are obtained.

| Compound: | Melting point, ° C. |
|---|---|
| S-allyl dihydrothiophenonium chloride | 143–145 |
| S-n-hexyl dihydrothiophenonium bromide | 98–100 |
| S,S'-ethylenebis(dihydrothiophenonium bromide) | 212–214 |
| S-n-decyl dihydrothiophenonium chloride | ---- |
| S-n-dodecyl dihydrothiophenonium bromide | 100–110 |
| S-tridecyl dihydrothiophenonium chloride | ---- |
| S-oleyl dihydrothiophenonium chloride | ---- |
| S-stearyl dihydrothiophenonium chloride | ---- |

*Example 9.—Preparation of S-carboxymethyl-2,5-dihydrothiophenonium bromide*

A solution of 2.8 grams of bromoacetic acid in two milliliters of methanol was treated with 1.8 grams of dihydrothiophene. After an hour a spontaneous exothermis reaction occurred with the formation of a gelatinous mass. Addition of acetone gave a white, crystalline precipitate soluble in water. After recrystallization from methanol, it melted at one hundred and twenty-five to one hundred and twenty-seven degrees. The neutralization equivalent, bromine analysis, and elemental analysis confirmed the identity of the product.

*Example 10.—Fungicidal utility of representative compounds of this invention*

Tomato plants infected with spores of *Alternaria solani*, the causative pathogenic fungus of early blight disease, were sprayed with the various test chemicals in aqueous solution at a concentration of 0.04 percent by weight. Several plants were left unsprayed as controls. At a time when the control plants had developed severe symptoms (leaf spotting) of early blight disease, the treated plants were examined and the degree of disease control was evaluated.

| Chemical: | Disease repression percent [1] |
|---|---|
| S-methyl-2,5-dihydrothiophenonium iodide | 0 |
| S-ethyl-2,5-dihydrothiophenonium bromide | 44 |
| S-n-butyl-2,5-dihydrothiophenonium bromide | 34 |
| S-n-hexyl-2,5-dihydrothiophenonium bromide | 36 |
| S-n-octyl-2,5-dihydrothiophenonium bromide | 70 |
| S-n-decyl-2,5-dihydrothiophenonium chloride | 90 |
| S-n-dodecyl-2,5-dihydrothiophenonium bromide | 100 |
| S-tridecyl-2,5-dihydrothiophenonium chloride | 100 |
| S-oleyl-2,5-dihydrothiophenonium chloride | 100 |
| S-cetyl-2,5-dihydrothiophenonium bromide | 100 |
| S-stearyl-2,5-dihydrothiophenonium chloride | 90 |
| S,S'-ethylenebis(2,5-dihydrothiophenonium bromide) | 88 |
| S-allyl-2,5-dihydrothiophenonium chloride | 61 |

[1] Repression of leaf lesions relative to untreated controls.

*Example 11.—Preparation of 1,2-ethylenebis (2,5-dihydrothiophenonium bromide) also known as S,S'-ethylenebis (2,5-dihydrothiophenonium bromide)*

A mixture of 9.4 grams of ethylene dibromide, 12.9 grams of 2,5-dihydrothiophene and fifteen milliliters of methanol were refluxed overnight. The precipitate of the bis(thiophenonium)bromide was filtered off. It melted at two hundred and twelve to two hundred and fourteen degrees.

*Analysis.*—Calcd. for $C_{10}H_{16}S_2Br_2$:Br, 44.4 percent. Found: Br (Volhard), 44.2 percent.

*Example 12*

Soil heavily infested with the causative organisms of seed decay (principally Pythium) was sprayed with 1,2-ethylene bis-(2,5-dihydrothiophenonium)bromide in aqueous solution at the rate of sixteen, eight and four pounds of the chemical per acre, and mixed into a three inch depth. Cucumber seeds and pea seeds were planted in the treated soil. One hundred percent germination occurred in the treated soil even at the four pound per acre rate. In an untreated control area, all seeds planted were destroyed by decay and no seedlings were obtained.

I claim:
1. A process for the preparation of 2,5-dihydrothiophene comprising reacting an alkali metal mercaptide, MSR, wherein M is an alkali metal selected from the group consisting of sodium, potassium and lithium and R is a monovalent organic radical selected from the group consisting of alkyl, alkyl S-(2,5-dihydrothiophenonium) halide, alkoxyalkyl and alkenylalkyl, with 1,4,-dihalobutene-2, until a substantial amount of the intermediate $RSCH_2CH=CHCH_2X$ is formed, wherein X is a halogen corresponding to a halogen of the 1,4-dihalobutene-2 reactant, and heating said intermediate until RX is formed.

2. A process for the preparation of 2,5-dihydrothiophene comprising reacting an alkali metal mercaptide, MSR, wherein M is an alkali metal selected from the group consisting of sodium, potassium and lithium and R is a monovalent organic radical selected from the group consisting of alkyl, alkyl S-(2,5-dihydrothiophenonium) halide, alkoxyalkyl and alkenylalkyl, with 1,4-dihalobutene-2 in the presence of inert solvent selected from the group consisting of water, lower alcohols and ketones, until a substantial amount of the intermediate, $RSCH_2CH=CHCH_2X$ is formed, wherein X is a halogen corresponding to a halogen of the 1,4-dihalobutene-2 reactant, and heating said intermediate until RX is formed.

3. A process for preparing a S-alkyl-2,5-dihydrothiophenonium halide of the formula

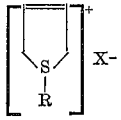

wherein R is selected from the group consisting of methyl, ethyl, propyl, isopropyl, butyl, amyl, isoamyl and hexyl, and X is selected from the group consisting of chlorine, bromine and fluorine, comprising reacting an alkali metal alkylmercaptide rectant with 1,4-dihalobutene-2 in the presence of an inert solvent selected from the group consisting of water, lower alcohols and ketones, until a substantial amount of the intermediate,

$RSCH_2CH=CHCH_2X$ is formed, wherein X is a halogen corresponding to a halogen of the 1,4-dihalobutene-2 reactant, heating the intermediate to a temperature under about 100 degrees centigrade and separating the rearranged S-alkyl dihydrothiophenonium halide product.

4. The process of preparing 2,5-dihydrothiophene comprising heating a S-alkyl-2,5-dihydrothiophenonium halide until the alkyl halide is evolved.

5. A S-substituted -2,5-dihydrothiophenonium halide of the structure

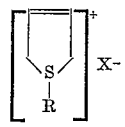

wherein R is a monovalent organic radical of at least two carbon atoms selected from the group consisting of alkyl, alkyl S-(2,5-dihydrothiophenonium) halide, alkoxyalkyl and alkenylalkyl, and X is a halide anion selected from the group consisting of chloride and bromide anions.

6. A S-substituted-2,5-dihydrothiophenonium halide of the structure

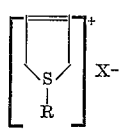

wherein R is alkyl S-(2,5-dihydrothiophenonium) halide, and X is a halide anion.

7. 1,2-ethylenebis(2,5-dihydrothiophenonium chloride).
8. 1,2 - propylenebis(2,5 - dihydrothiophenonium chloride).
9. 1,3 - propylenebis(2,5 - dihydrothiophenonium chloride).
10. 1,4 - tetramethylenebis(2,5 - dihydrothiophenonium chloride).
11. 2 - butenylene - 1,4 - bis(2,5-dihydrothiophenonium chloride).
12. 1,2 - ethylenebis(2,5 - dihydrothiophenonium bromide).

References Cited by the Examiner
UNITED STATES PATENTS 2,794,026  5/1957  Johnston _____ 260—327
2,965,649  12/1960  Johnston _____ 260—327

OTHER REFERENCES

Bennett: Trans. Faraday Soc., vol. 37, pps. 794–803 (1941).

Noller: Textbook of Organic Chemistry, Second edition, 1958, pps. 210–211.

Reid: Organic Chemistry of Bivalent Sulfur, Chem. Pub. Co., New York, vol. III (1960), pages 35 and 36.

Slobodin: Chemical Abstracts, vol. 33 (1939), page 1316.

WALTER A. MODANCE, *Primary Examiner.*

IRVING MARCUS, *Examiner.*